United States Patent
Tullos et al.

(10) Patent No.: US 8,043,510 B2
(45) Date of Patent: Oct. 25, 2011

(54) MERCURY REMOVAL WITH SORBENTS MAGNETICALLY SEPARABLE FROM TREATED FLUIDS

(75) Inventors: Erin Elizabeth Tullos, Bartlesville, OK (US); John Michael Hays, Bartlesville, OK (US); Roland Schmidt, Bartlesville, OK (US); Joe B. Cross, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/913,542

(22) Filed: Oct. 27, 2010

(65) Prior Publication Data

US 2011/0068059 A1    Mar. 24, 2011

Related U.S. Application Data

(60) Provisional application No. 61/256,195, filed on Oct. 29, 2009.

(51) Int. Cl.
*C02F 1/42* (2006.01)
(52) U.S. Cl. ........ 210/688; 210/695; 210/914; 210/661; 210/675
(58) Field of Classification Search .......... 210/688, 210/695, 914, 661, 675–676
See application file for complete search history.

(56) References Cited

U.S. PATENT DOCUMENTS

| | | | | |
|---|---|---|---|---|
| 3,617,563 | A * | 11/1971 | Fuxelius | 210/688 |
| 4,147,626 | A * | 4/1979 | Findlay et al. | 210/724 |
| 4,170,552 | A * | 10/1979 | Generini | 588/319 |
| 4,614,592 | A | 9/1986 | Goggin et al. | |
| 5,107,060 | A | 4/1992 | Yan | |
| 5,200,087 | A * | 4/1993 | Nishihara | 210/718 |
| 5,304,693 | A | 4/1994 | Boitiaux et al. | |
| 5,441,648 | A * | 8/1995 | Lidzey | 210/695 |
| 5,595,666 | A * | 1/1997 | Kochen et al. | 210/679 |
| 6,268,543 | B1 | 7/2001 | Sakai et al. | |
| 6,806,398 | B2 | 10/2004 | Sakai et al. | |
| 6,896,815 | B2 * | 5/2005 | Cort | 210/695 |
| 7,255,793 | B2 * | 8/2007 | Cort | 210/695 |
| 7,419,605 | B2 * | 9/2008 | Zhuang | 210/725 |
| 7,435,338 | B2 | 10/2008 | Carnell | |
| 2010/0155335 | A1 * | 6/2010 | Taboada-Serrano et al. | 210/663 |

FOREIGN PATENT DOCUMENTS

| EP | 0342898 | 11/1989 |
|---|---|---|
| WO | WO2008020250 | 2/2008 |

OTHER PUBLICATIONS

Leeper, J.E., Mercury—LNG's Problem, Calgon Carbon Corporation, reprinted from Hydrocarbon Processing, Nov. 1980 by Gulf Publishing Co., Houston, Texas.

* cited by examiner

*Primary Examiner* — Chester Barry

(57) ABSTRACT

Methods and apparatus relate to treatment of fluids to remove mercury contaminants in the fluid. Contact of the fluid with active outer surfaces of particles magnetically separable from the fluid loads the particles with the mercury contaminants. Magnetic separation then removes from the fluid the particles loaded with the mercury contaminants such that a treated product remains.

3 Claims, 2 Drawing Sheets

MERCURY REMOVAL WITH SORBENTS MAGNETICALLY SEPARABLE FROM TREATED FLUIDS

CROSS-REFERENCE TO RELATED APPLICATIONS

This application is a non-provisional application which claims benefit under 35 USC §119(e) to U.S. Provisional Application Ser. No. 61/256,195 filed Oct. 29, 2009, entitled "MERCURY REMOVAL WITH SORBENTS MAGNETICALLY SEPARABLE FROM TREATED FLUIDS," which is incorporated herein in its entirety.

STATEMENT REGARDING FEDERALLY SPONSORED RESEARCH OR DEVELOPMENT

None

FIELD OF THE INVENTION

Embodiments of the invention relate to methods and systems for removing mercury from fluids.

BACKGROUND OF THE INVENTION

Presence of mercury in hydrocarbon streams can cause problems with upstream and downstream processing units as well as health and environmental issues. Removal of the mercury to achieve acceptable levels presents problems with prior techniques. Fixed bed sorbent applications for crude oil and heavy hydrocarbons tend to foul and become plugged. Prior sorbent particles utilized in fluidized bed applications still require separation of the particles from treated fluids. Such separation procedures rely on filtration that results in similar clogging issues as encountered with the fixed bed sorbent applications.

Therefore, a need exists for improved methods and systems for removing mercury from fluids.

SUMMARY OF THE INVENTION

In one embodiment, a method of removing mercury from a liquid includes preparing a mixture with a mercury-containing liquid in contact with particles. The particles include a core formed of magnetic material and have active outer surfaces defined by at least one of a metal chloride and a metal sulfide. Magnetic separation of the slurry into a treated liquid and the particles loaded with the mercury enables removing mercury extracted from the mercury-containing liquid by the active outer surfaces of the particles.

According to one embodiment, a system for removing mercury from a liquid includes a bed reactor having inputs coupled to sources of a mercury-containing liquid hydrocarbon and particles that include magnetic material and have sulfided outer surfaces. Further, the system includes a magnetic separator coupled to receive a slurry from flow through the inputs into the bed reactor. The magnetic separator divides the particles that are loaded with mercury and a resulting treated liquid hydrocarbon into respective separate outputs of the magnetic separator.

For one embodiment, a method includes preparing a mixture with a mercury-containing liquid hydrocarbon in contact with particles. The particles each include an iron sulfide outer surface on a ferromagnetic core of iron. Removing mercury extracted from the mercury-containing liquid hydrocarbon by the iron sulfide outer surfaces of the particles thereby provides a treated liquid hydrocarbon upon applying a magnetic field to the slurry in order to separate the particles that are loaded with the mercury from the treated liquid hydrocarbon.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to treatment of fluids to remove mercury contaminants in the fluid. Contact of the fluid with active outer surfaces of magnetic particles loads the particles with the mercury contaminants. The term magnetic as used herein refers to capability of being magnetized or attracted by a magnet. Since the particles are thus magnetically separable from the fluid, magnetic separation then removes from the fluid the particles loaded with the mercury contaminants such that a treated product remains.

Figure 1:
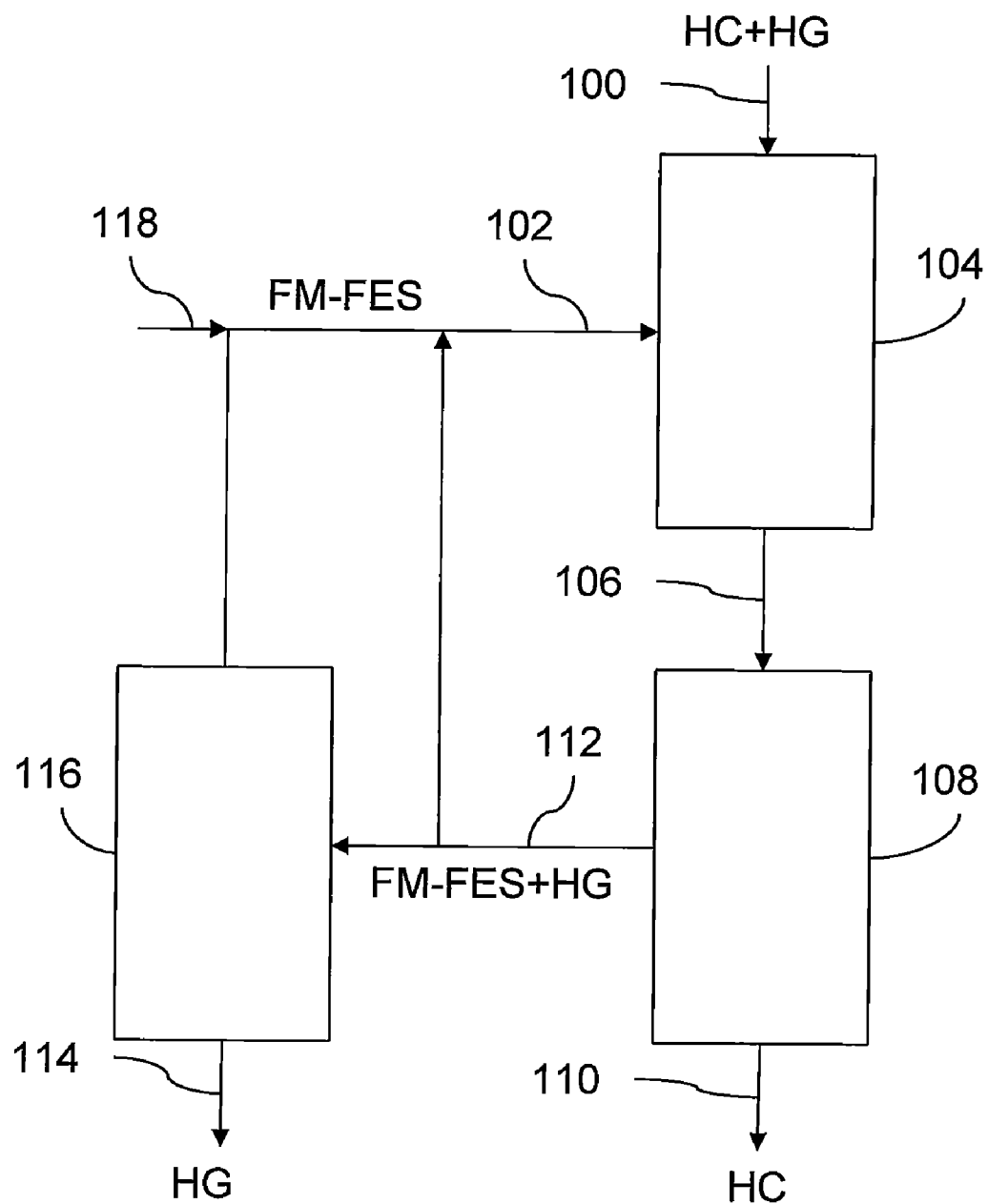
FIG. 1 is a schematic of a treatment system for removing mercury from liquid hydrocarbons with sorbent separated from the hydrocarbons by magnetic separation, according to one embodiment of the invention.

FIG. 1 shows a schematic of an exemplary treatment system. The system includes a mixer 104, such as a fluidized bed reactor, and a magnetic separator 108. In some embodiments, the system further includes a regeneration unit 116 for recycling particles introduced into the mixer 104 and divided out by the magnetic separator 108, as described further herein.

In operation, a first input 100 introduces a mercury-containing feed stream into the mixer 104. As used herein, mercury within the feed stream refers to elemental mercury (Hg) and/or compounds with mercury. The feed stream may include liquid hydrocarbons (HC) that are contaminated with the mercury. Crude oil provides one example of the feed stream.

A second input 102 supplies into the mixer 104 particles used for capturing and removing the mercury from the feed stream. The particles and the feed stream form a mixture or slurry in the mixer 104 with the feed stream thereby contacting the particles. The particles include magnetic material and active outer surfaces capable of extracting mercury. The magnetic material for one embodiment defines central cores of the particles with the active outer surfaces disposed on the magnetic material. While the active outer surfaces may be at least one of metal sulfides and metal chlorides of a different metal than a ferromagnetic metal forming the magnetic material, the active outer surfaces for ease of preparation in one embodiment are at least one of metal sulfides and metal chlorides of the ferromagnetic metal forming the magnetic material. Suitable metals that have capacity for being sulfided and hence capturing of the mercury include iron, nickel, cobalt and combinations thereof. Examples of the ferromagnetic metal capable of providing sufficient magnetic properties of the magnetic material to enable subsequent separation also include iron, nickel, cobalt and combinations thereof.

In one embodiment, forming the particles includes reacting solid iron substrates with hydrogen sulfide flowed into contact with the solid iron substrates. The sulfur reacts only with exposed portions of the substrates leaving central portions of the substrate as iron. The particles thus may contain only or essentially only the iron as the ferromagnetic (FM) metal forming the magnetic material and iron sulfide (FeS) as the sulfided outer surfaces.

For some embodiments, the particles move with flow of the slurry such that plugging in the mixer 104 is avoided. For example, the mixer 104 may permit circulation of the particles within the slurry instead of establishing a fixed bed of the particles. The mixer 104 if configured as the fluidized bed reactor enables fluidizing of the particles. Regardless of how all or some mixing of the particles in contact with the feed stream occurs, the slurry once formed passes as indicated by combined flow line 106 to the magnetic separator 108. As a result of mercury sorption due to the active surfaces of the particles, the contact causes the particles to retain the mercury from the feed stream.

The magnetic separator 108 includes a magnet to withdraw the particles from liquids within the slurry based on the magnetic material of the particles. The magnetic separator thus divides the slurry into a treated liquid output 110 and a solids output 112. The treated liquid output 110 with hydrocarbons thereby contains less of the mercury and has a lower mercury concentration than the feed stream that is introduced into the mixer 104 via the first input 100.

The particles loaded with the mercury and contained in the solids output 112 of the magnetic separator 108 may be discarded if spent or may supply the second input 102 into the mixer 104 before or after the particles pass through the regeneration unit 116. A fresh source 118 of the particles further supplies the second input 102 into the mixer 104 as needed for particle replacement purposes. A waste output 114 from the regeneration unit 116 contains the mercury desorbed from the particles during regeneration of the particles. For some embodiments, the regeneration includes heating of the particles to between 150° C. and 650° C. such that the mercury desorbs from the particles.

Figure 2:
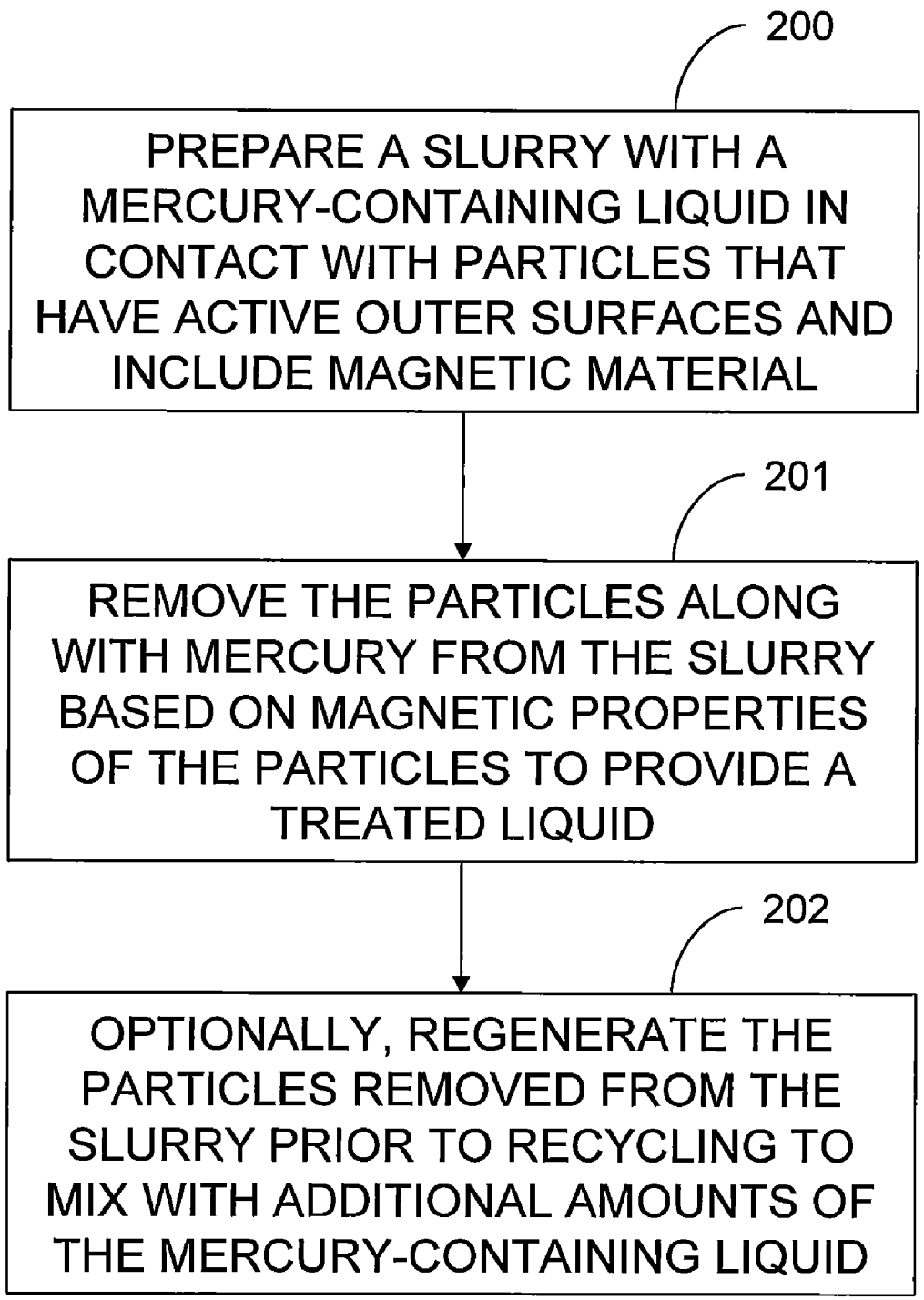
FIG. 2 is a flow chart illustrating a method of treating a liquid utilizing a sorbent for mercury and magnetic separation to remove the sorbent from the liquid, according to one embodiment of the invention.

FIG. 2 illustrates a method of treating for mercury contamination utilizing particles, such as described herein, that are sorbents for mercury and magnetic separation to remove the particles from the liquid. In a preparation step 200, blending a mercury-containing liquid into contact with the particles that have active outer surfaces and include magnetic material produces a mixture or slurry. A separation step 201 provides a treated liquid upon removing the particles along with mercury from the slurry based on magnetic properties of the particles. Regenerating the particles removed occurs in an optional recycling step 202 such that the particles that are regenerated can be reused by mixing with additional amounts of the mercury-containing liquid.

Example

Surfaces of iron particles were sulfided by exposing the particles to hydrogen sulfide. The particles remained capable of being attracted by a magnet following being sulfided. A bottle test was then performed at about 23° C. using 3 grams of the particles mixed with 3 grams of decane having 859 parts per billion by weight (ppbw) mercury. The decane was decanted from the particles and analyzed for residual mercury content determined to be 8 ppbw. Over 99% of the mercury was removed from the decane utilizing the particles that are separable from the decane after contacting the decane for sorption of the mercury. Magnetic properties of the particles can facilitate such separation of the particles without relying on filtering through a permeable media.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising:
preparing a slurry with a mercury-containing liquid hydrocarbon in contact with particles each having an iron sulfide outer surface on a ferromagnetic core of iron; and
removing mercury extracted from the mercury-containing liquid hydrocarbon by the iron sulfide outer surfaces of the particles, wherein the removing provides a treated liquid hydrocarbon and includes applying a magnetic field to the slurry in order to separate the particles that are loaded with the mercury from the treated liquid hydrocarbon,
wherein the particles are formed by reacting an iron substrate with hydrogen sulfide.

2. The method according to claim 1, further comprising regenerating the particles loaded with the mercury to thereby remove the mercury from the particles for recirculation to prepare the slurry.

3. The method according to claim 1, wherein the removing of the mercury captures at least 99% of the mercury in the mercury-containing liquid hydrocarbon to provide the treated liquid hydrocarbon.

* * * * *